(12) United States Patent
Miller et al.

(10) Patent No.: US 11,445,696 B2
(45) Date of Patent: Sep. 20, 2022

(54) BED SYSTEM

(71) Applicants: Tia Bryn Miller, Culver City, CA (US); Young LeQuang, Culver City, CA (US)

(72) Inventors: Tia Bryn Miller, Culver City, CA (US); Young LeQuang, Culver City, CA (US)

( * ) Notice: Subject to any disclaimer, the term of this patent is extended or adjusted under 35 U.S.C. 154(b) by 0 days.

(21) Appl. No.: 16/681,746

(22) Filed: Nov. 12, 2019

(65) Prior Publication Data
US 2021/0137069 A1      May 13, 2021

(51) Int. Cl.
*A01K 1/035* (2006.01)

(52) U.S. Cl.
CPC .................... *A01K 1/0353* (2013.01)

(58) Field of Classification Search
CPC ...... A01K 1/035; A01K 1/0353; A47C 20/02; A47C 16/00; A47G 9/06; A47G 9/0223
See application file for complete search history.

(56) References Cited

U.S. PATENT DOCUMENTS

| | | | | |
|---|---|---|---|---|
| 2,626,407 A * | 1/1953 | Kurry | ................ | A47D 9/005 5/99.1 |
| 3,129,438 A * | 4/1964 | Hall | ................ | A61G 7/02 5/695 |
| 5,010,843 A * | 4/1991 | Henry | ................ | A01K 1/0353 119/28.5 |
| 5,088,139 A * | 2/1992 | Bloom | ................ | A47D 13/063 190/1 |
| 5,136,981 A * | 8/1992 | Barreto, III | ................ | A01K 1/0353 119/28.5 |
| 5,662,065 A * | 9/1997 | Bandimere | ................ | A01K 1/0353 119/28.5 |
| 5,724,911 A * | 3/1998 | McAlister | ................ | A01K 1/0353 119/28.5 |
| 5,765,502 A * | 6/1998 | Haugh | ................ | A01K 1/0353 119/28.5 |
| 6,588,036 B1 * | 7/2003 | Hort | ................ | A45F 4/06 5/413 R |
| 7,676,871 B1 * | 3/2010 | Leach | ................ | A47D 13/08 5/655 |
| 7,856,688 B2 * | 12/2010 | Dockendorf | ................ | A47D 13/08 5/655 |
| 9,788,663 B2 * | 10/2017 | Furuland | ................ | A47D 15/008 |
| 2004/0134433 A1 * | 7/2004 | Holder | ................ | A01K 1/0353 119/28.5 |
| 2007/0022526 A1 * | 2/2007 | Leach | ................ | A47K 3/127 4/572.1 |
| 2007/0245494 A1 * | 10/2007 | Dockendorf | ................ | A47C 16/00 5/655 |
| 2014/0190417 A1 * | 7/2014 | Lipscomb | ................ | A01K 1/0353 119/28.5 |
| 2020/0154669 A1 * | 5/2020 | Chen | ................ | A01K 1/035 |

* cited by examiner

*Primary Examiner* — Magdalena Topolski
*Assistant Examiner* — Kevin M Dennis
(74) *Attorney, Agent, or Firm* — Cohen IP Law Group, PC; Michael N. Cohen (57) ABSTRACT

A bed system is disclosed. The bed system may include a perimeter support and associated bedding and may be used by a person or an animal. The bedding may include an upper cavity to receive the support and a lower portion configured with a perimeter zipper. By closing the zipper, the support transitions from a linear configuration to an arc-shaped configuration defining the perimeter of the bed. The inner region of the bed comprises soft ruffled material formed by the gathered lower portion.

15 Claims, 13 Drawing Sheets

BED SYSTEM

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to pet beds, including pet beds with built-in interior ruffled fabric and supportive sides.

BACKGROUND

According to the American Pet Products Association, over sixty-eight percent of U.S. households, or about eighty-five million families, own a pet. Many of these pets are "indoor" pets (typically dogs and/or cats) that are primarily kept indoors within their owner's home.

As is known, many pets enjoy sleeping on ruffled-up blankets or similar (e.g., on couch blankets or on piles of laundry). It is also known that pets typically enjoy sleeping in the same place each night. As such, many owners provide pet beds for the animals.

However, most of these pet beds do not provide a blanket (or any other type of ruffled-up material), and so, the owner may be required to provide a blanket that may easily be lost or misplaced.

In addition, many of the pet beds do not provide adequate support to the animals' head and/or neck, nor do the beds adjust to the shape of the sleeping animal.

Also, many of the pet beds are not machine washable.

Accordingly, there is a need for a pet bed that provides an amount of ruffled-up material in the sleeping area for the pet to enjoy. There is also a need for a pet bed that provides support to the head and neck areas of the animal while adjusting its shape to fit the shape of the animal's body. There is also a need for a pet bed that is easily disassembled for machine washing and then easily reassembled for use.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the bed system according to exemplary embodiments hereof includes a bed support (e.g., a cylindrical foam bolster, a mass of loose fabric, etc.) and an associated cover (e.g., a soft fabric bed cover). The system provides an easy-to-assemble bed. When assembled, the bed provides a sleeping area with soft ruffled fabric surrounded by a soft bolster that form fits to the general shape of the person or animal sleeping in the bed. The bolster also supports the animal's head and neck while sleeping. While it is understood by a person of ordinary skill in the art that the bed system may be used by a person or an animal, for the purposes of this specification, the bed system will be described in relation to its use by an animal (e.g., by a pet such as a dog, cat, pig or other types of pets).

In some embodiments, the pet bed system may be opened (e.g., by unzipping the zipper), and the support may be removed. In this way, the cover may be laundered separately. Once cleaned, the pet bed assembly may be easily reassembled.

Figure 1:
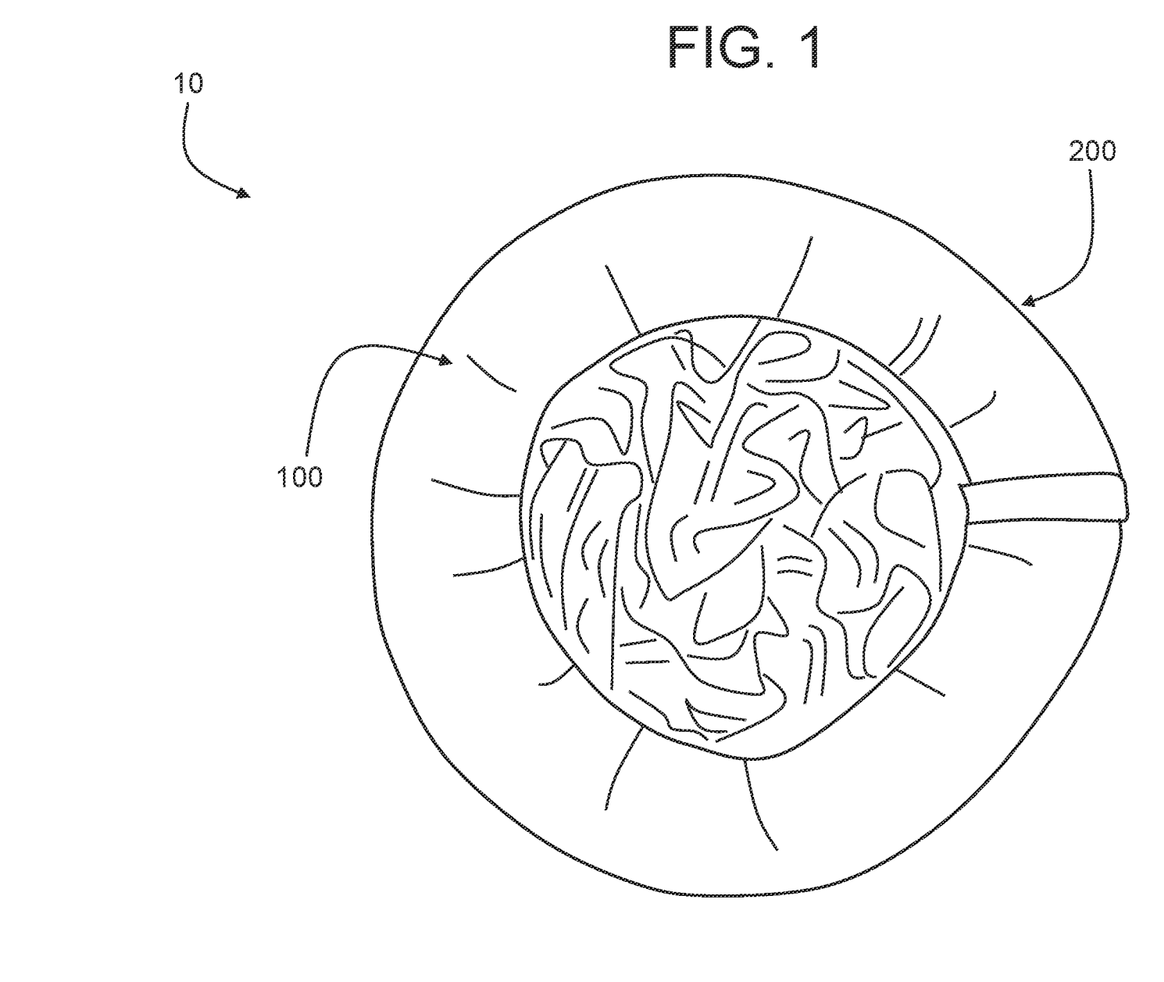
FIG. 1 shows aspects of an animal bed system according to exemplary embodiments hereof.

In one exemplary embodiment hereof, as shown in FIG. 1, the pet bed system 10 may include a bedding assembly 100 and a bed support 200. In general, the bed support 200 may define the perimeter 14 of the bed system 10 with in inner region 12 within which the pet may sleep. The support 200 may provide lateral support to the bed system 10 and the bedding assembly 100 may provide a soft cover for the bed. The system 10 may also include other components and elements as necessary for the system 10 to perform its functionalities.

Figure 2:
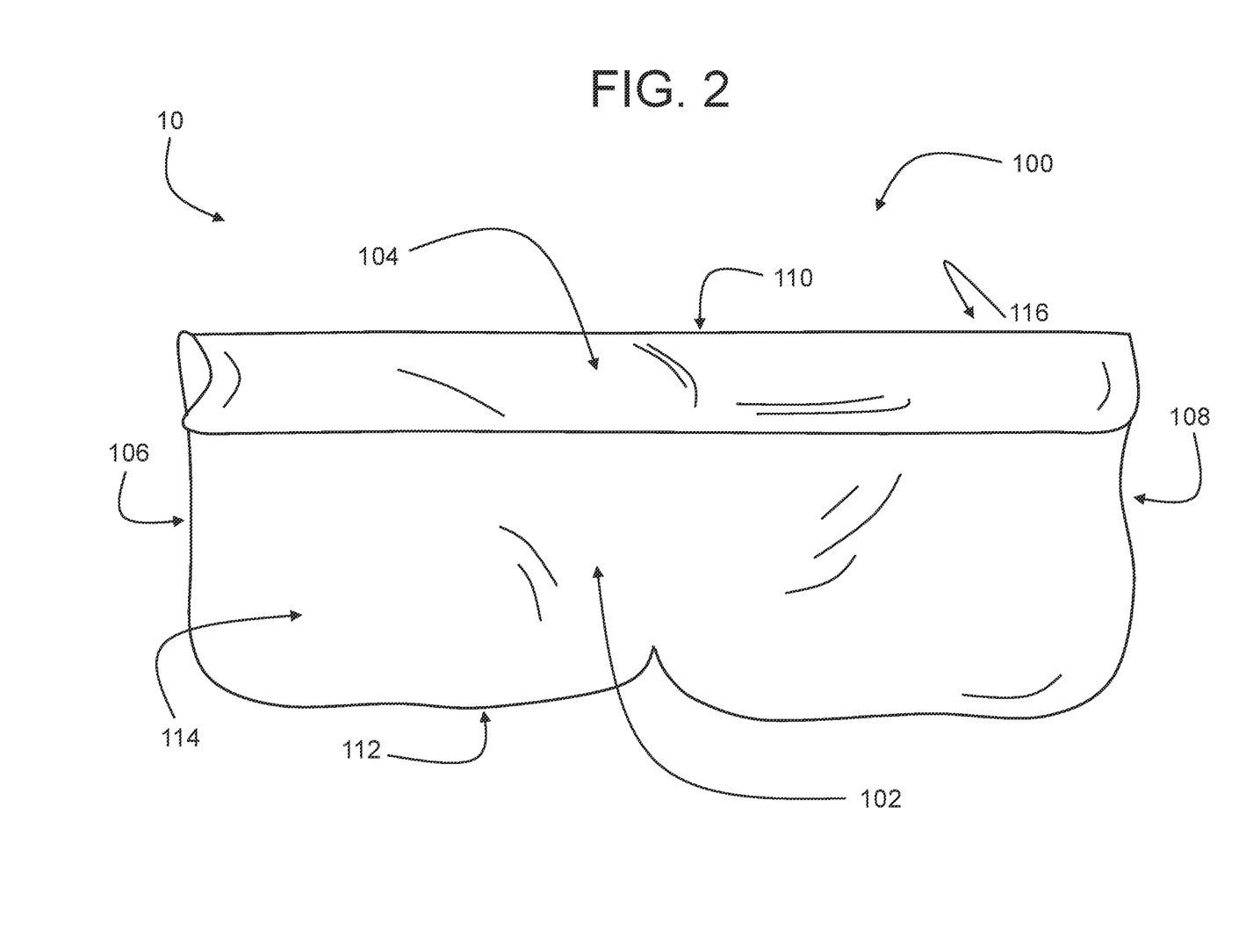
FIGS. 2-3 show aspects of a bedding assembly of an animal bed system according to exemplary embodiments hereof.

In one exemplary embodiment hereof as shown in FIG. 2, the bedding assembly 100 may comprise a flat flexible material (e.g., a soft fabric) that may include a main portion 102 (also referred to as a lower portion 102) and a support portion 104 (also referred to as an upper portion 104). In some embodiments, the bedding assembly 100 is generally rectangular, but it is understood that the bedding assembly 100 may be other shapes such as square, trapezoidal and other shapes. FIG. 2 shows the bedding assembly 100 lying flat with a left side 106, a right side 108, a top side 110, a bottom side 112, a front 114 and a back 116.

Figure 3:
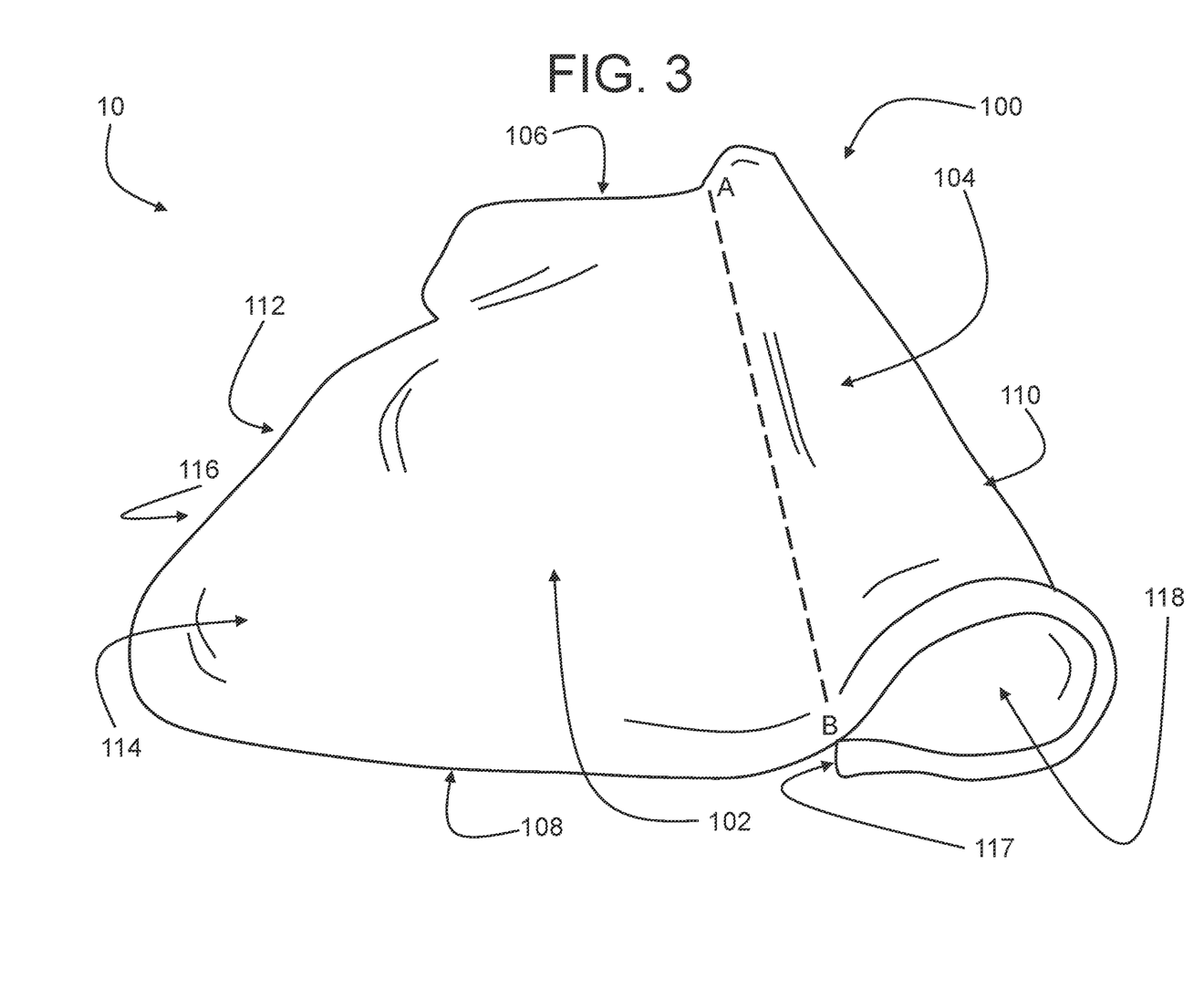

FIG. 3 shows the bedding assembly 100 of FIG. 2 rotated 90° clockwise. As shown, the support portion 104 is formed by folding over the fabric on the top side 110 and attaching the leading edge 117 of the folded support portion 104 to the main portion 102 along line A-B. While FIG. 2 shows the fabric folded from the front 114 to the back 116, the fabric may also be folded from the back 116 to the front 114.

As will be described in other sections, the attachment along line A-B may be performed using any type of attachment mechanisms and/or techniques, including without limitation, one or more zippers, snaps, buttons, hooks, stitching, hook and loop material, other types of attachment mechanisms and any combination thereof.

The folded support portion 104 forms a tunnel or cavity 118 extending from the left side 106 to the right side 108 (or at least a portion thereof). As will be described in other sections, the cavity 118 is adapted to receive the support 200 and secure it therein. In some embodiments, the cavity 118 includes end caps 120 at its open left 108 side and at its open right 106 side that may generally cover all or a portion of the openings. However, this may not be necessary.

Figure 4A:
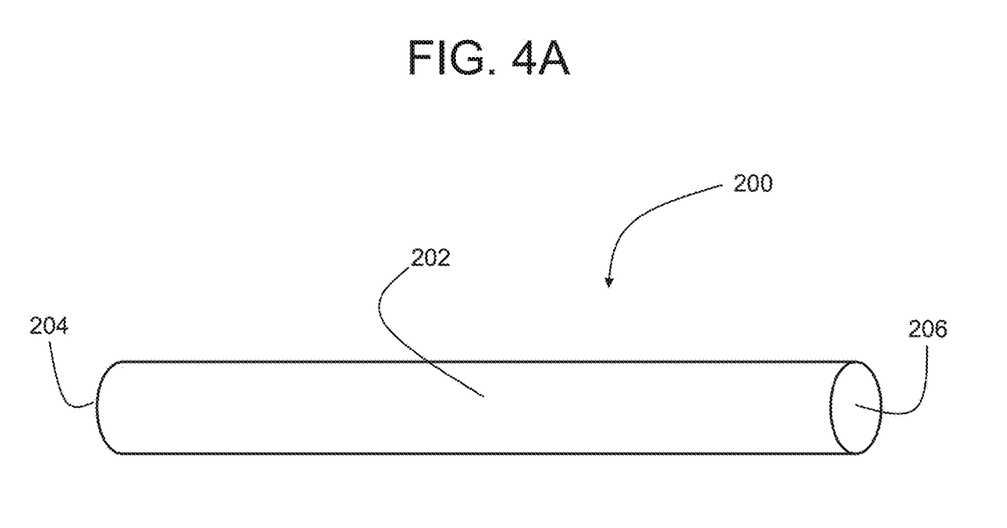
FIGS. 4A and 4B show aspects of an animal bed system support according to exemplary embodiments hereof.

In one exemplary embodiment hereof as shown in FIG. 4A, the support 200 may include a cylindrical support structure with a body 202, a left end 204 and a right end 206. While FIG. 4A depicts the support 200 as generally having a circular cross-section, the support 200 may have other shaped cross-sections such as oval, octagonal, other shapes and any combination thereof. In some embodiments, the support 200 may comprise a soft compressible material such as foam, rubber, a shell with stuffed padding, other types of materials and any combination thereof.

Figure 4B:
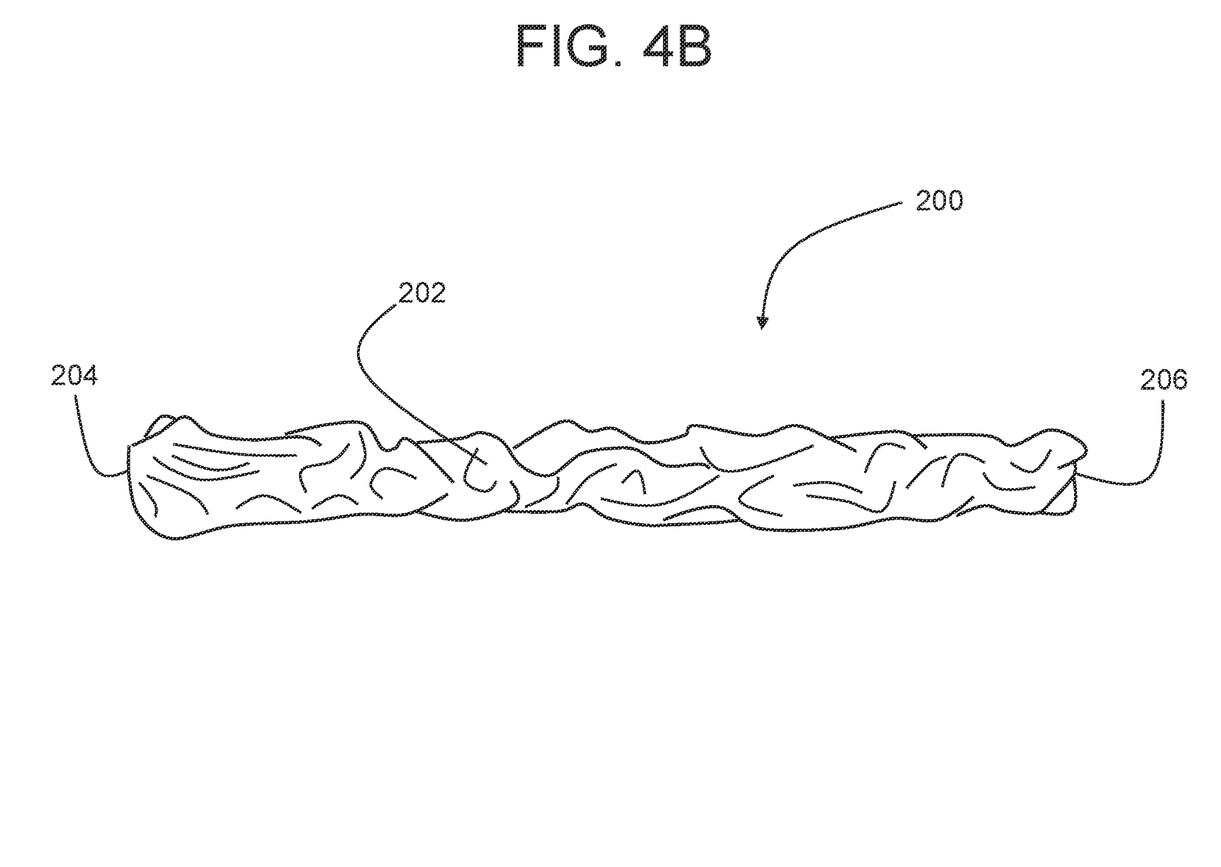

In one exemplary embodiment hereof as shown in FIG. 4B, the support 200 may include a mass of loose fabric with a body 202, a left end 204 and a right end 206. As shown, the mass of loose fabric may be formed into a generally elongated shape to form the structure 200. The body 202 may comprise a single piece of loose fabric or multiple pieces of loose fabric. The loose fabric may comprise any types of materials such as, without limitation, cotton, polyester, velvet, silk, linen, canvas, other types of fabric and any combination thereof.

While FIGS. 4A and 4B depict the support 200 as comprising a cylindrical support structure and/or loose fabric, it is understood that the support 200 may comprise any combinations of these, as well as any other type of structure and/or materials, and any combination of other structures and/or materials that may provide the support necessary for the system 10 to perform its intended functionalities. For example, the support 200 may include a structure filled with pellets (e.g., a bean bag pillow type structure), or any other types of support structures. It is also understood that the support 200 may comprise a single support structure or multiple support structures.

Figure 5:
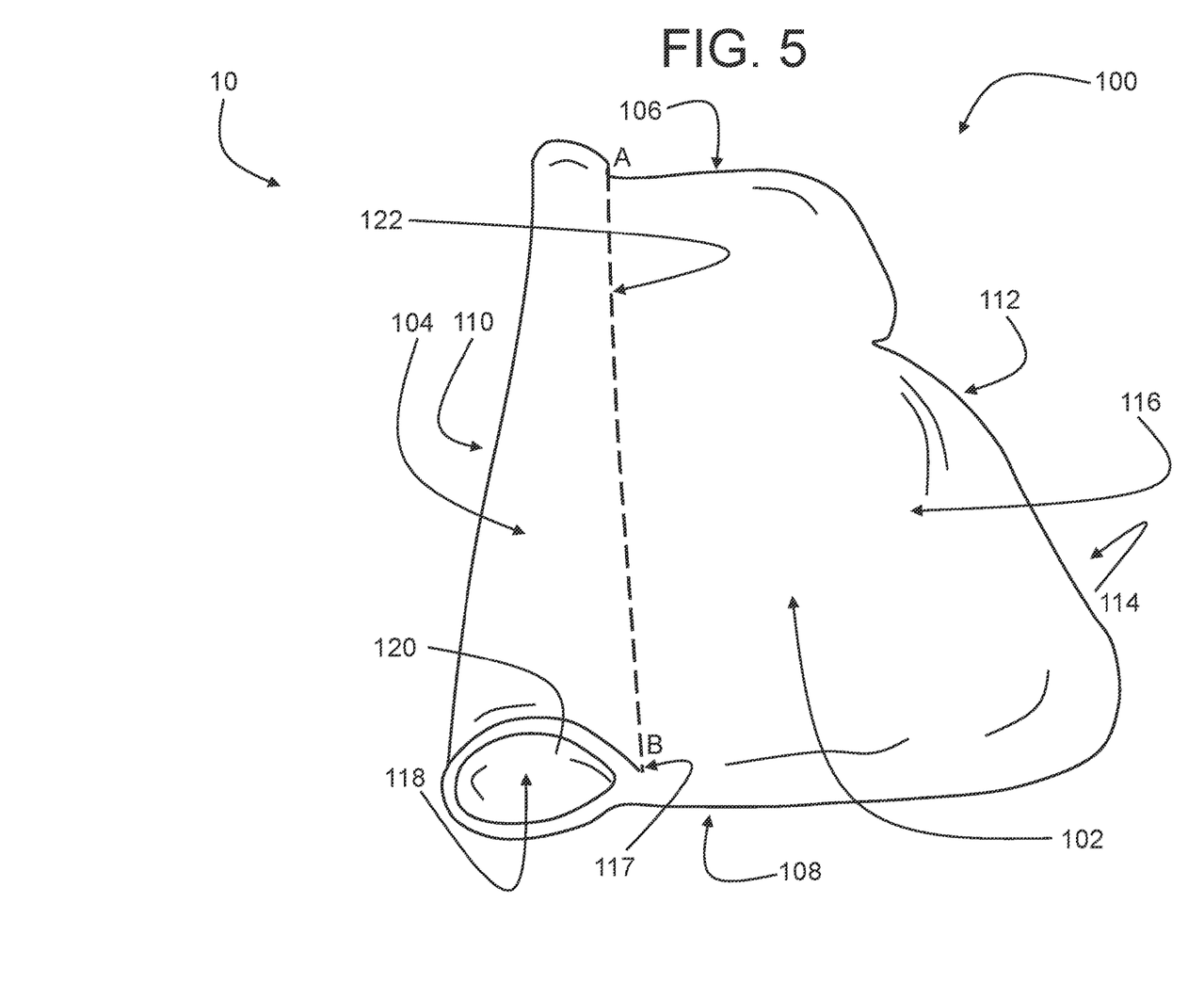
FIGS. 5-6 show aspects of bedding assembly of an animal bed system according to exemplary embodiments hereof.

FIG. 5 shows the bedding assembly 100 of FIG. 3 flipped over from the right to the left so that the bedding assembly 100 is resting on its front 114.

In one exemplary embodiment hereof, the leading edge 117 of the folded support portion 104 is attached to the main portion 102 along line A-B using a zipper 122. The zipper 122 may travel from A to B or from B to A and may include a single zipper 122 or multiple zippers 122. In some embodiments, unzipping zipper 122 may completely release the leading edge 117 of the folded support portion 104 from the main portion 102. In other embodiments, unzipping the zipper 122 may release at least enough of the leading edge 117 of the folded support portion 104 from the main portion 102 sufficient to allow for the insertion of the support 200 into the cavity 118 through the unzipped portion. In this case, a portion of the leading edge 117 in the proximity of point A and/or point B may remain connected to the main portion 102 (e.g., by the left and right end caps 120).

Figure 6:
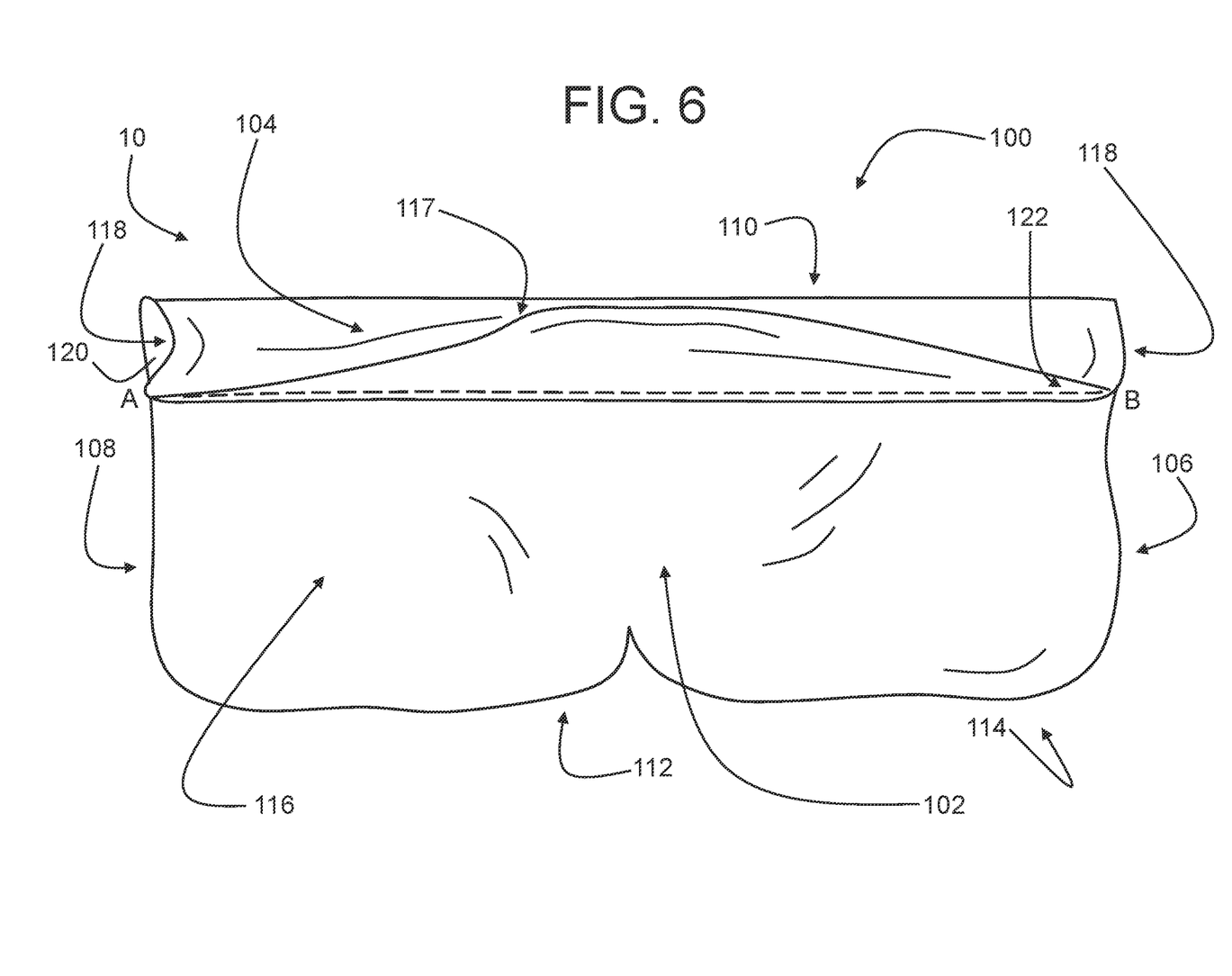
Figure 7:
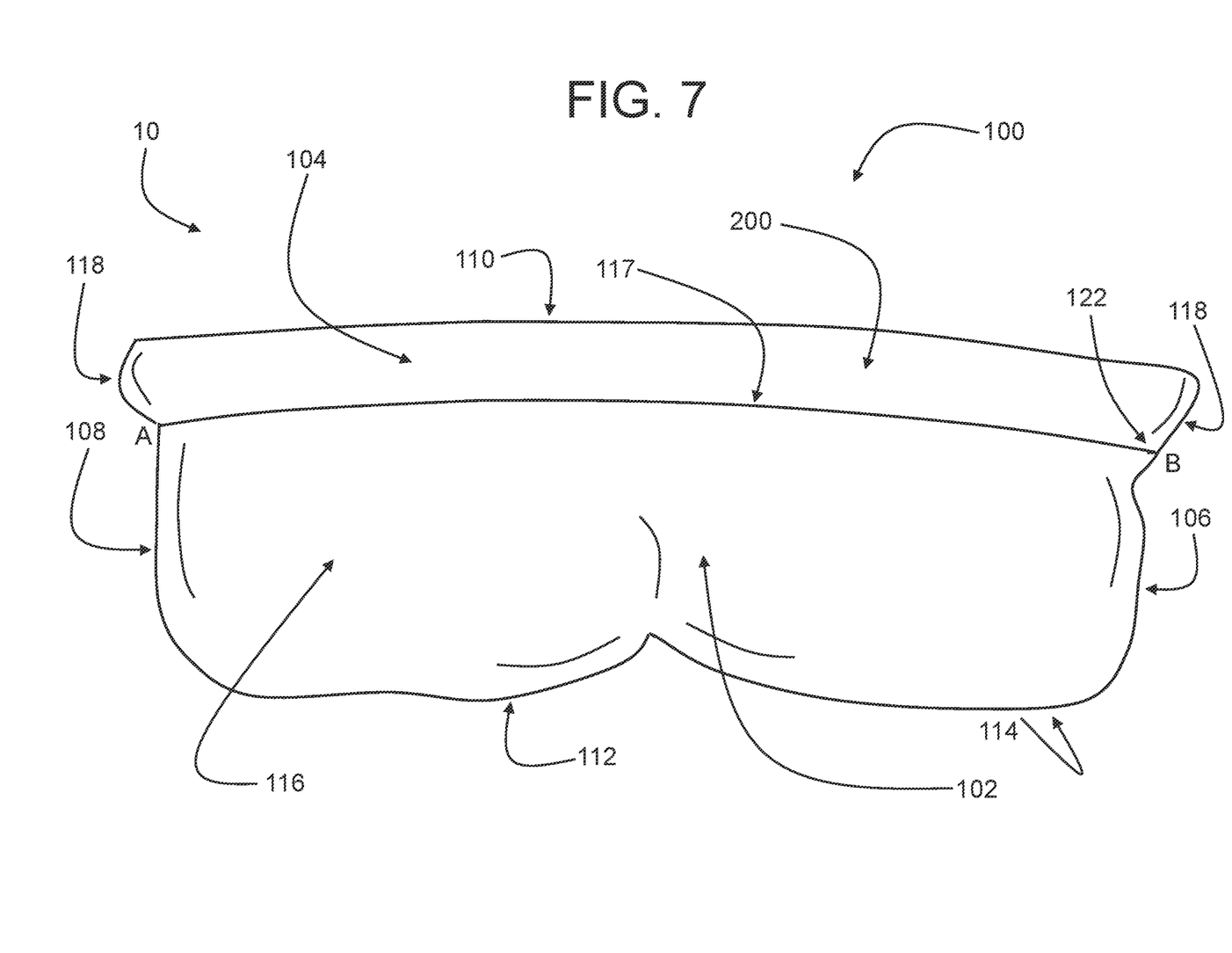
FIGS. 7-12 show aspects of an animal bed system according to exemplary embodiments hereof.

FIG. 6 shows the zipper 122 unzipped from point A to point B such that the leading edge 117 of the folded support portion 104 is not attached to the main portion 102 (except potentially in the areas in close proximity to points A and B due to the end caps 120). In one exemplary embodiment hereof, the support 200 may be inserted into the opened cavity 118 in the area where the leading edge 117 is unzipped from the main portion 102. It may be preferable that the length of the support from its left side 204 to its right side 206 generally correspond to the width of the support portion 102 of the bedding assembly from point A to point B, and that the longitudinal axis of the support 200 (from the left side 204 to the right side 206) is aligned with the longitudinal axis of the cavity 118 (from the left side 106 to the right side 108). In this way, the support 200 may fit snuggly inside the cavity 118 when the leading edge 117 is zipped closed and thereby attached to the main portion 102. FIG. 7 shows the support 200 inserted into the cavity 118 and the leading edge 117 attached (zipped) to the main portion 102 from point A to point B.

Figure 8:
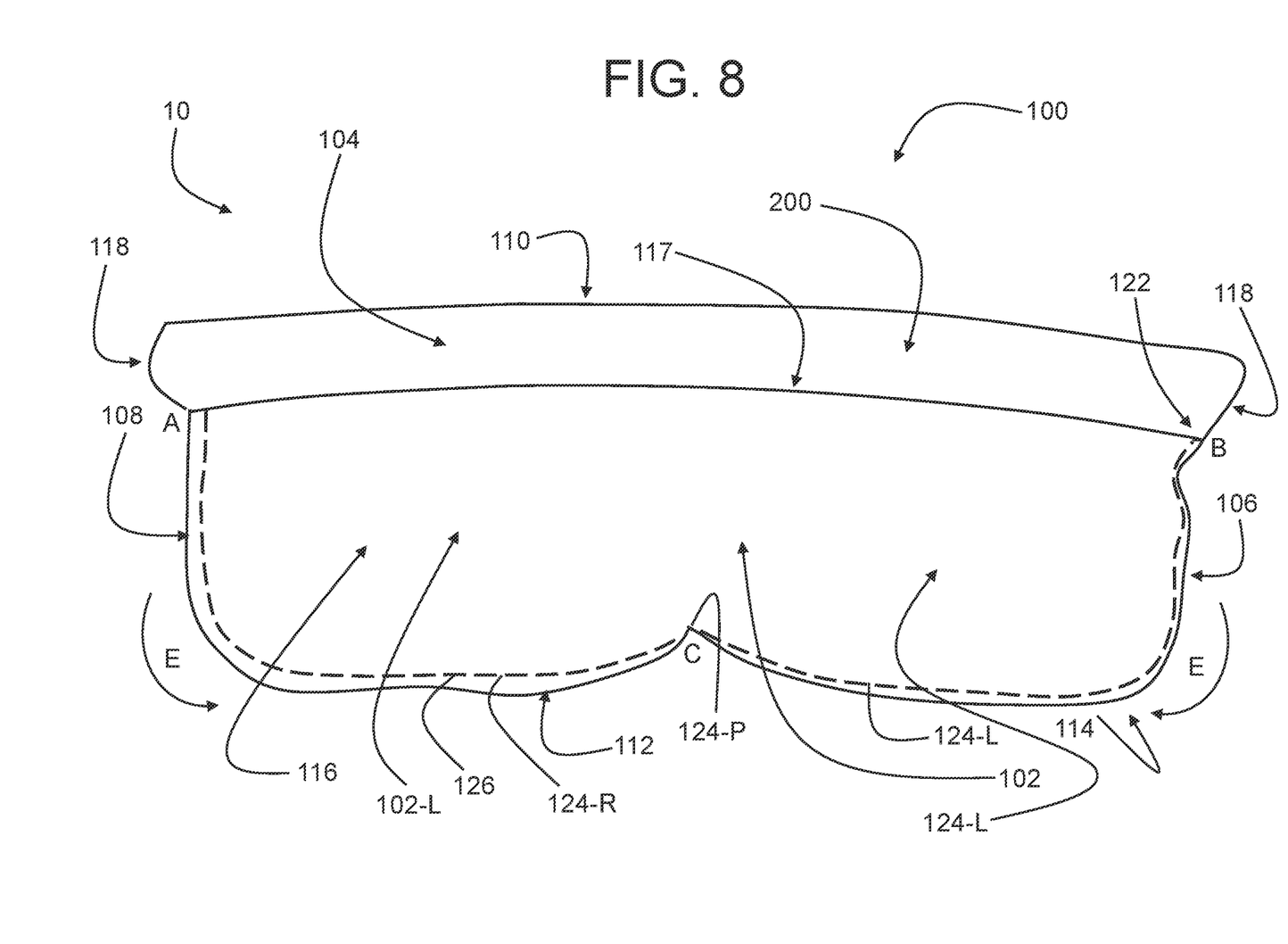

In one exemplary embodiment hereof as shown in FIG. 8, the main portion 102 includes a left main portion 102-L (also referred to as a left lower portion 102-L) and a right main portion 102-R (also referred to as a right lower portion 102-R). The main portion 102 also includes a zipper 124 that includes a zipper left side 124-L (extending from point A to point C along the left and bottom perimeters of the left main portion 102-L and depicted as a dashed line) and a zipper right side 124-R (extending from point B to point C along the right and bottom perimeters of the right main portion 102-R depicted as a dashed line) that may be zipped together using a zipper pull 124-P. The main portion 102 may also include a zipper cover 126 to cover the mated zipper sections 124-L, 124-R as will be described in other sections.

Figure 9:
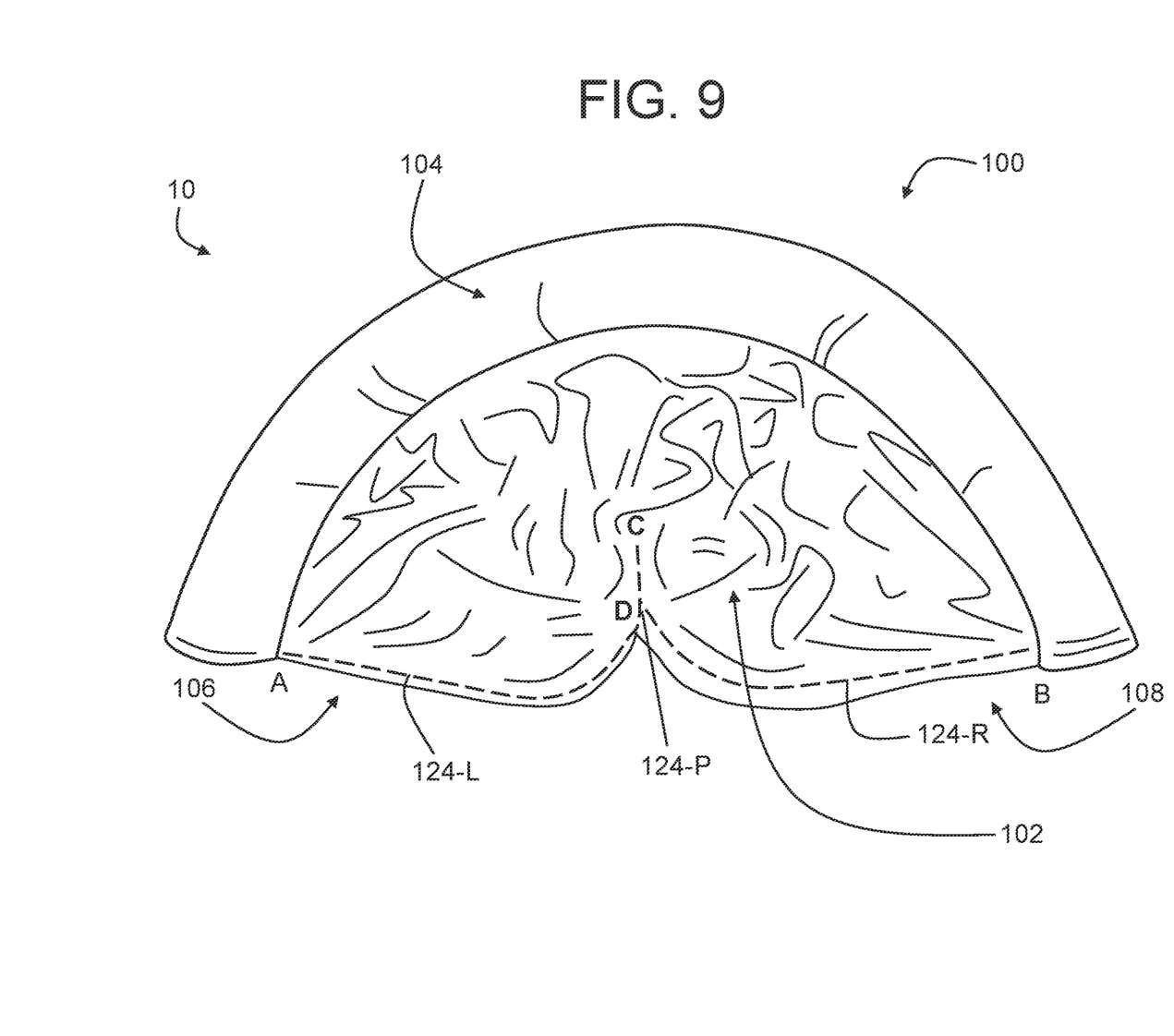

When the zipper pull 124-P is used to zip the zipper left side 124-L to the zipper right side 124-R, the zipper left side 124-L and the zipper right side 124-R are pulled together (mated) thereby also pulling together the left main portion 102-L and the right main portion 102-R along their left and right sides 106, 108 and lower perimeters respectively (in the direction of arrows E). This is shown in FIG. 9 where the left and right side zipper sections 124-L, 124-R are mated from point A to point D. Note that FIG. 9 shows the pet bed system 10 of FIG. 8 flipped over to be right-side-up. As shown, the lower perimeters of the left main portion 102-L and the right main portion 102-R are partially pulled together, thereby forming the support section 104 into an arc shape.

Figure 10:
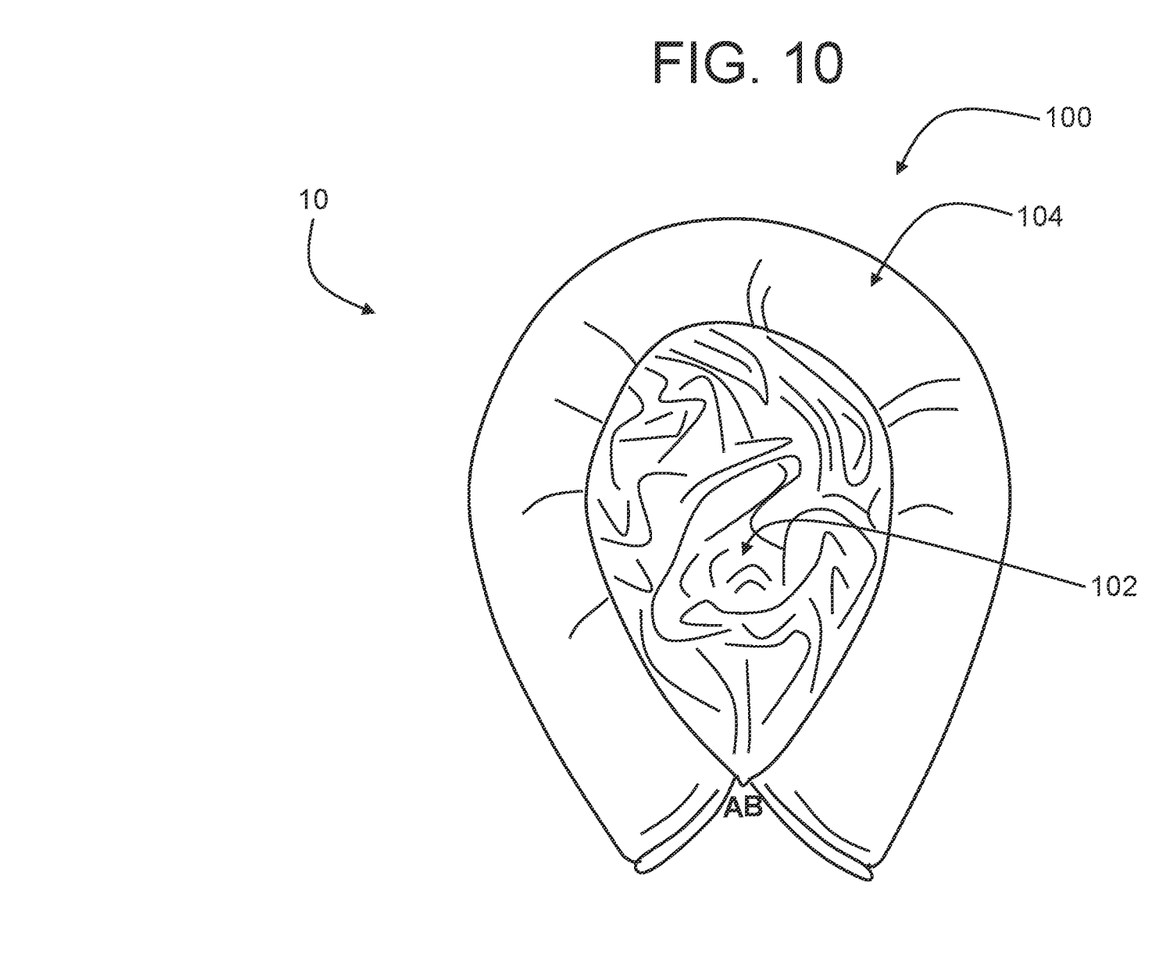

As the zipper pull 124-P is used to further zip the left side and right side zipper sections 124-L, 124-R together, the left and right main portions 102-L, 102-R are pulled together until the zipper sections 124-L, 124-R are fully mated and the points A and B are generally aligned. This is shown in FIG. 10.

Figure 11:
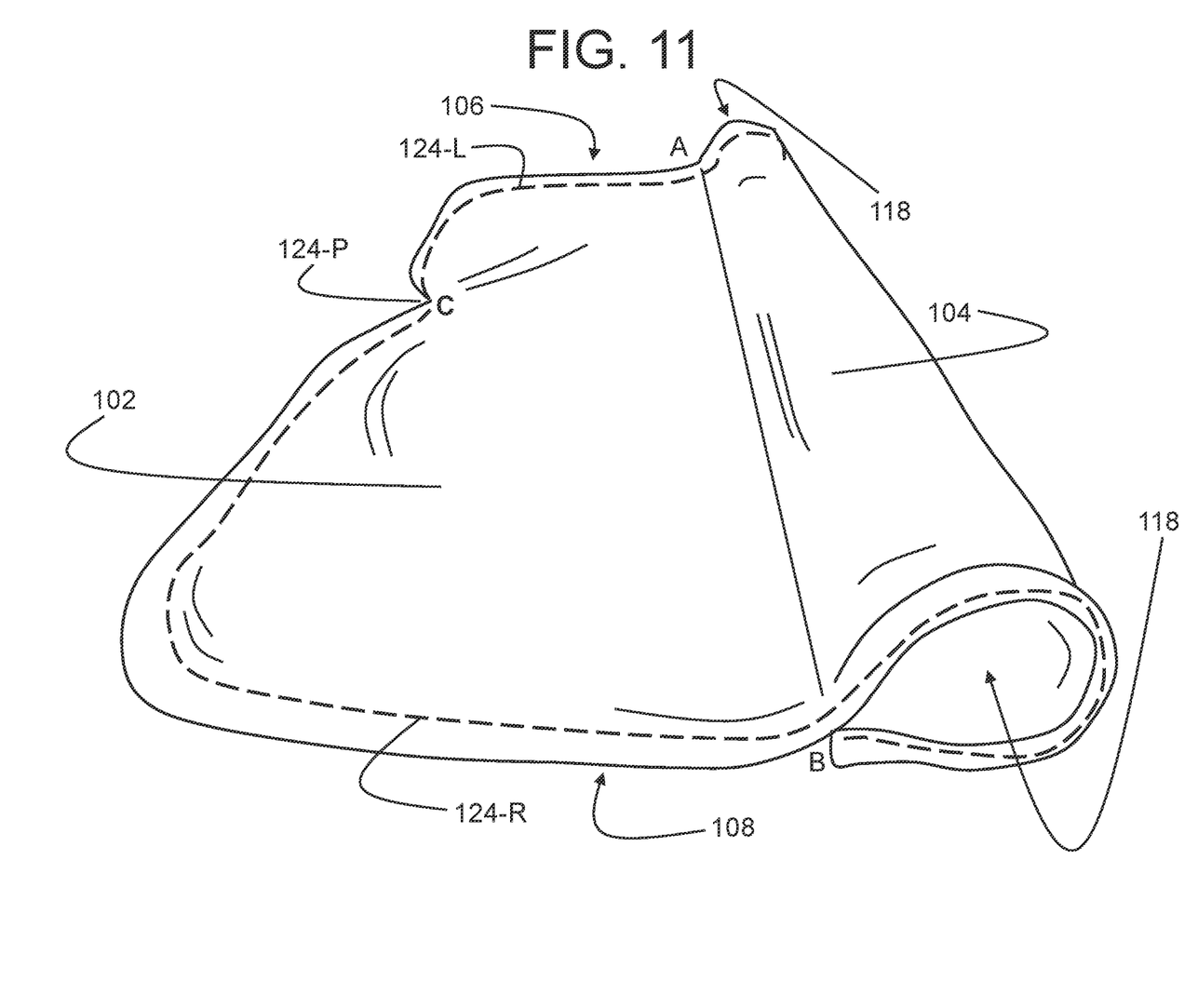
Figure 12:
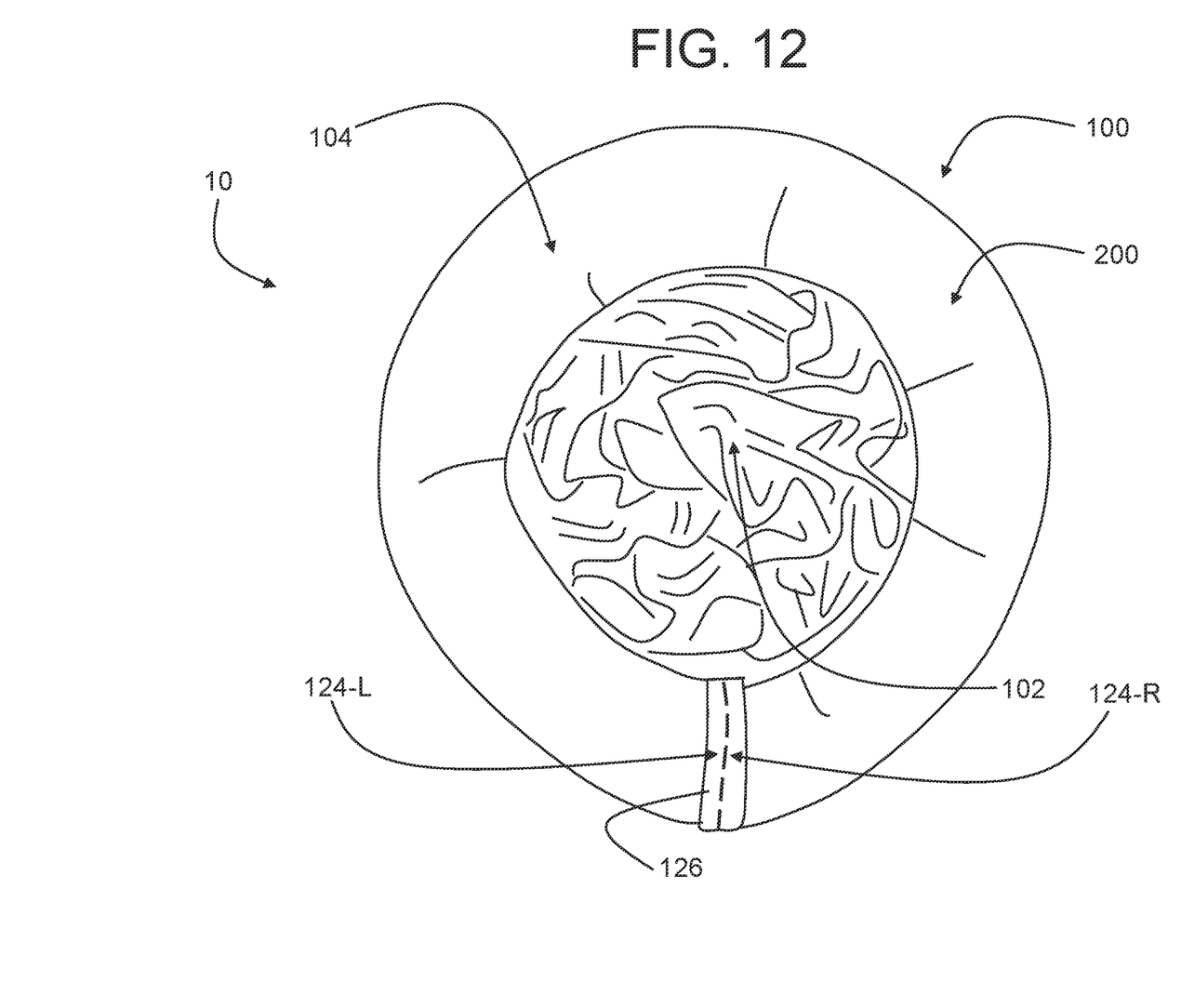

In one exemplary embodiment hereof as shown in FIG. 11, the right side zipper section 124-R also extends around the right edge of the support portion 104 (around the circumferential edge of the cavity 118 on the right side 108). In addition, the left side zipper section 124-L extends around the left edge of the support portion 104 (around the circumferential edge of the cavity 118 on the left side 106). In this way, when the left side zipper section 124-L is zipped together with the right side zipper section 124-R, the left and right circumferential edges of the cavity 118 of the support section 104 are also be zipped together thereby mating the left end 204 of the support 200 with the right end 206 of the support 200. The result of this is shown in FIG. 12. The zipper cover 126 may then be used to generally cover the zipper 124 to prevent the zipper 124 from coming into contact with a pet within the bed 10.

It is understood by a person of ordinary skill in the art that the zipper 124 may be replaced with other types of attachment mechanisms without limiting the scope of the system 10. For example, the zipper 124 may be replaced with buttons, snaps, hook and loop material and/or other types of attachment mechanisms to form the bed system 10 as described above.

As shown in FIG. 12, by pulling the support 200 within the support portion 104 into a circle, the bed 10 includes a perimeter 12 (formed by the support 200) with an inner region 14 (sleeping area) to receive the pet. As seen, the main portion 102 is gathered in the inner region 14 of the bed 10 and becomes ruffled (there is excess material). This ruffled main portion 102 may then be used by the pet as a blanket for comfort and warmth.

In one exemplary embodiment hereof, the support 200 is comprised of a soft compressible material such as foam, rubber, one or more masses of loose fabric, a fabric shell with stuffed padding, other types of materials and any combination thereof. In this way, when assembled as described above, the support 200 may be malleable and able to be formed into other shapes by a pet resting in the inner region 12. For example, if a larger pet shifts position or stretches out while in the inner region 12, the support 200 may take the form of an elongated oval to accommodate the stretched-out pet. In other embodiments, the support 200 may be used as a head pillow for the resting pet while the pet is positioned in the inner region 12 thus providing support to the animal's head and neck.

To remove the support 200 from the bedding assembly 100, the steps described above may be generally taken in reverse order. Once the support 200 is removed from the bedding assembly 100, the bedding assembly 100 may be washed (e.g., in a washing machine). Note that the support 200 may also be washable during this step (e.g., if the support 200 comprises loose fabric). The bedding assembly 100 and the support 200 may then be recombined as described to form the pet bed system 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", (c) and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:
1. A bed system comprising:
   a bedding including a left side, a right side, a top side, a bottom side, a front, and a back;
   an elongate support member including a first end and a second end and attached to the top side with the first end near the left side and the second end near the right side and the elongate support member extending therebetween;
   a first attachment mechanism extending along a first perimeter, the first perimeter extending from a first position on the left side near the first end to a second position on the bottom side between the left side and the right side; and a second attachment mechanism extending along a second perimeter, the second perimeter extending from a third position on the right side near the second end to a fourth position on the bottom side between the left side and the right side;

wherein the first and second attachment mechanisms are adapted to releasably mate the first perimeter and the second perimeter continuously from a fifth position coinciding with the first position of the first perimeter and the third position of the second perimeter to a sixth position coinciding with the second position of the first perimeter and the fourth position of the second perimeter;

wherein the elongate support member transitions from a straight configuration to an arc-shaped configuration when the first and second attachment mechanisms attach the first perimeter to the second perimeter.

2. The bed system of claim 1 wherein the elongate support member includes an elongated pad.

3. The bed system of claim 2 wherein the elongated pad is cylindrical.

4. The bed system of claim 1 wherein the front becomes ruffled within the arc-shaped configuration.

5. The bed system of claim 1 wherein the arc-shaped configuration is in a shape of a circle or an oval.

6. The bed system of claim 1 wherein the support member includes fabric.

7. The bed system of claim 6 wherein the fabric includes a mass of fabric formed into an elongated structure.

8. The bed system of claim 1 wherein the first attachment mechanism and/or the second attachment mechanism is selected from a group: a zipper, buttons, snaps and hook and loop material.

9. The bed system of claim 1 wherein the top side includes a cavity extending from the left side to the right side and a third attachment mechanism adapted to open and close the cavity.

10. The bed system of claim 9 wherein the opening is adapted to receive the support member into the cavity.

11. The bed system of claim 9 wherein the third attachment mechanism is selected from a group: a zipper, buttons, snaps and hook and loop material.

12. The bed system of claim 1 wherein the bed system is an animal bed.

13. The bed system of claim 1 wherein the first attachment mechanism includes a first zipper section that terminates at a zipper pull located at the sixth position, and the second attachment mechanism includes a second zipper section that terminates at the zipper pull located at the sixth position.

14. The bed system of claim 13 wherein the zipper pull is adapted to zip the first zipper section and the second zipper section into an aligned engagement.

15. The bed system of claim 1 further comprising:

a cavity configured with the top side and extending from the left side to the right side, wherein the cavity is adapted to receive the elongate support member and to secure it therein.

* * * * *